United States Patent
Park et al.

(10) Patent No.: US 10,364,668 B2
(45) Date of Patent: Jul. 30, 2019

(54) MEASURING MICRO STALLS AND STICK SLIPS IN MUD MOTORS USING FIBER OPTIC SENSORS

(71) Applicant: HALLIBURTON ENERGY SERVICES, INC., Houston, TX (US)

(72) Inventors: Steven Park, Edmonton (CA); Ankit Purohit, Singapore (SG); Bhargav Gajji, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 379 days.

(21) Appl. No.: 15/128,646

(22) PCT Filed: Jun. 27, 2014

(86) PCT No.: PCT/US2014/044665
§ 371 (c)(1),
(2) Date: Sep. 23, 2016

(87) PCT Pub. No.: WO2015/199730
PCT Pub. Date: Dec. 30, 2015

(65) Prior Publication Data
US 2017/0152741 A1    Jun. 1, 2017

(51) Int. Cl.
*E21B 47/00* (2012.01)
*E21B 47/12* (2012.01)
(Continued)

(52) U.S. Cl.
CPC .............. *E21B 47/123* (2013.01); *E21B 4/02* (2013.01); *E21B 47/00* (2013.01); *E21B 47/14* (2013.01);
(Continued)

(58) Field of Classification Search
CPC ..................................................... E21B 47/123
(Continued)

(56) References Cited

U.S. PATENT DOCUMENTS

| 6,021,377 A | 2/2000 | Dubinsky et al. |
| 6,068,642 A | 5/2000 | Johnson et al. |

(Continued)

FOREIGN PATENT DOCUMENTS

| CN | 102256844 A | 11/2011 |
| CN | 103701359 A | 4/2014 |

(Continued)

OTHER PUBLICATIONS

Office Action; Chinese Application No. 2014800776222; dated Apr. 10, 2018.
(Continued)

*Primary Examiner* — Hien D Khuu
(74) *Attorney, Agent, or Firm* — Polsinelli PC

(57) ABSTRACT

A fiber optic sensor is disposed in the elastomer of the stator of the mud motor in order to sense elastomer strain while drilling. The frequencies of micro stalls and stick slips are measured from the fiber optic sensor data by classification using thresholds or by converting time-domain measurements from the fiber optic sensor data to frequencies. For example, the frequencies are produced by accumulating a histogram over an interval of time or by computing a Discrete Fourier Transform over an interval of time. A plurality of fiber optic sensors also can sense angular position of the rotor of the mud motor for correlation of the micro stalls and stick slips with the angular position. The measurements of the micro stalls and stick slips are used to select remedial action such as changes in drilling parameters.

18 Claims, 10 Drawing Sheets

(51) Int. Cl.
*E21B 4/02* (2006.01)
*E21B 47/14* (2006.01)
*G01D 5/353* (2006.01)
*E21B 47/18* (2012.01)
*G01B 11/16* (2006.01)

(52) U.S. Cl.
CPC .............. *E21B 47/18* (2013.01); *G01B 11/16* (2013.01); *G01D 5/353* (2013.01); *G01D 5/35316* (2013.01); *G01D 5/35361* (2013.01); *G01D 5/35364* (2013.01)

(58) Field of Classification Search
USPC .......................................................... 702/75
See application file for complete search history.

(56) References Cited

U.S. PATENT DOCUMENTS

| | | | |
|---|---|---|---|
| 6,102,681 | A | 8/2000 | Turner |
| 6,857,486 | B2 | 2/2005 | Chitwood et al. |
| 7,163,065 | B2 | 1/2007 | Zhang et al. |
| 7,708,086 | B2 | 5/2010 | Witte |
| 7,954,560 | B2 | 6/2011 | Mathiszik et al. |
| 8,020,616 | B2 | 9/2011 | Greenaway |
| 8,151,907 | B2 | 4/2012 | MacDonald |
| 8,180,614 | B2 | 5/2012 | Pabon et al. |
| 8,191,628 | B2 | 6/2012 | Konschuh et al. |
| 8,417,495 | B2 | 4/2013 | Dashevskiy |
| 2001/0045300 | A1* | 11/2001 | Fincher .................. E21B 7/068 175/26 |
| 2002/0066309 | A1 | 6/2002 | Tubel et al. |
| 2006/0071158 | A1 | 4/2006 | Van Der Spek |
| 2009/0169364 | A1* | 7/2009 | Downton ............... B22D 15/00 415/118 |
| 2009/0188665 | A1 | 7/2009 | Tubel et al. |
| 2009/0320609 | A1 | 12/2009 | Xia et al. |
| 2010/0038137 | A1 | 2/2010 | Morris |
| 2011/0186353 | A1* | 8/2011 | Turner ................. G05B 13/048 175/40 |
| 2011/0232966 | A1 | 9/2011 | Kyllingstad |
| 2012/0013893 | A1 | 1/2012 | Maida et al. |
| 2012/0097451 | A1 | 4/2012 | Mock |
| 2012/0222900 | A1 | 9/2012 | Rodney et al. |
| 2013/0076526 | A1 | 3/2013 | Schberth et al. |
| 2013/0186687 | A1* | 7/2013 | Snyder ..................... E21B 7/04 175/40 |
| 2013/0341090 | A1 | 12/2013 | Zeineddine et al. |
| 2014/0159550 | A1 | 6/2014 | O'Bryan et al. |

FOREIGN PATENT DOCUMENTS

| | | |
|---|---|---|
| CN | 103857867 A | 6/2014 |
| CN | 103890304 A | 6/2014 |
| EP | 553908 A2 | 8/1993 |
| WO | 2010138718 A1 | 12/2010 |

OTHER PUBLICATIONS

English Abstract of CN103701359; retrieved from www.espacenet.com on Aug. 1, 2018.

English Abstract of CN103890304; retrieved from www.espacenet.com on Aug. 1, 2018.

English Abstract of CN102256844; retrieved from www.espacenet.com on Aug. 1, 2018.

English Abstract of CN103857867; retrieved from www.espacenet.com on Aug. 1, 2018.

International Search Report and Written Opinion; PCT Application No. PCT/US2014/044665; dated Mar. 27, 2015.

\* cited by examiner

MEASURING MICRO STALLS AND STICK SLIPS IN MUD MOTORS USING FIBER OPTIC SENSORS

CROSS-REFERENCE TO RELATED APPLICATIONS

This application is a national stage entry of PCT/US2014/044665 filed Jun. 27, 2014, said application is expressly incorporated herein in its entirety.

FIELD

The present disclosure generally relates to downhole logging while drilling, and more specifically relates to measuring micro stalls and stick slips in mud motors.

BACKGROUND

For directional drilling, a drill bit at the end of a drill string is turned by a mud motor. The mud motor is powered by the flow of drilling mud that is pumped at the surface into the drill string and issues from the end of the drill string to clear cuttings from the well bore. Specifically, the mud motor may include a rotor coupled to the drill bit, and the flow of drilling mud through the mud motor may cause the rotor to rotate and drive the drill bit.

In certain instances, the drill bit and rotor may stop turning, causing the mud motor to stall. A mud motor stall may cause a blockage of the flow of drilling mud through the mud motor, which sends a pressure pulse back to the surface through the drilling mud. When a stall is detected during drilling, the drill string is retracted to free up the bit from the formation, and then drilling can be resumed. Frequent stalls can be addressed by adjusting drilling parameters such as the mud flow rate and the weight on the bit, the composition of the drilling mud, and the configuration of the bit.

DETAILED DESCRIPTION

Figure 1:
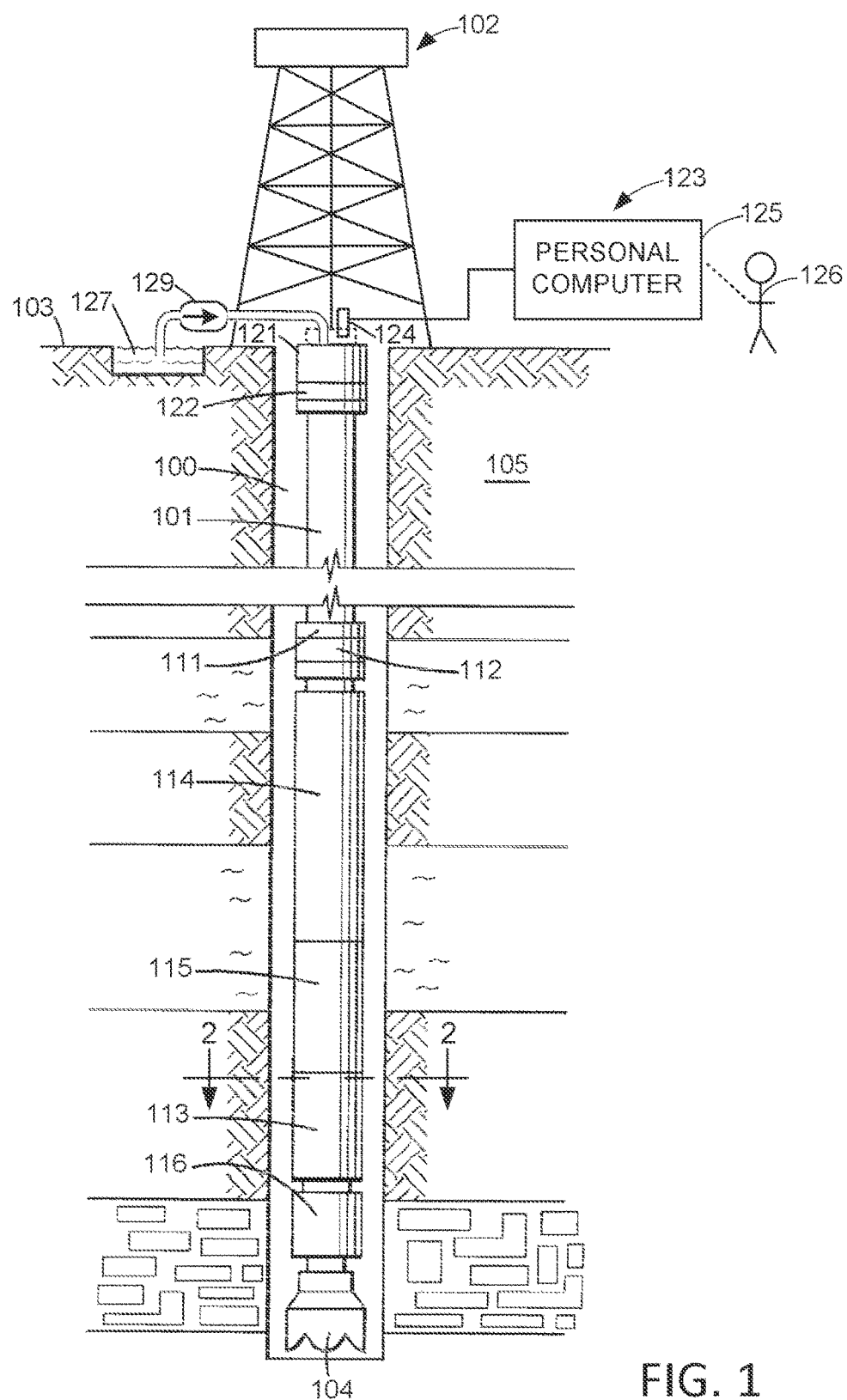
FIG. 1 is a diagram of an example system for well logging while drilling a well bore.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of, the surrounding wellbore even though the wellbore or portions of it may be deviated or horizontal. Correspondingly, the transverse, axial, lateral, longitudinal, radial, and the like orientations shall mean positions relative to the orientation of the wellbore or tool. Additionally, the illustrated embodiments are depicted so that the orientation is such that the right-hand side is downhole compared to the left-hand side.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "communicatively coupled" is defined as connected, either directly or indirectly through intervening components, and the connections are not necessarily limited to physical connections, but are connections that accommodate the transfer of data between the so-described components. The term "substantially" is defined to be essentially conforming to the particular dimension, shape or other thing that "substantially" modifies, such that the component need not be exact. For example, substantially cylindrical means that the object resembles a cylinder, but can have one or more deviations from a true cylinder.

The term "radial" and/or "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Referring now to FIG. 1, a system for drilling a well bore 100 includes a drill string 101 supported by a rig 102 at the surface 103. A drill bit 104 at the end of the drill string 101 creates the well bore 100 through the surrounding formation 105, which may also include formation boundaries. A mud pump 129 pumps drilling mud from a mud tank 127 and down through the drill string 101 and up the annulus around the drill string 101 to cool the drill bit 104 and remove cuttings from the well bore 100. The drilling mud passes through a mud motor 113 driven by the flow of the drilling mud. The mud motor 116 rotates the drill bit 104.

A sensor sub-unit 111 is situated above the drill bit 104. The sensor sub-unit 111 carries telemetry apparatus 112 for transmitting, receiving, and processing telemetry signals passing along drill string 101 to and from the surface 103. For illustrative purposes, the sensor sub-unit 111 is shown in FIG. 1 positioned above the mud motor 113. Additional sensor sub-units 114, 115, 116 may be included as desired in the drill string 101. The sensor sub-unit 116 is positioned below the motor 113, and this sensor sub-unit 116 has telemetry apparatus to communicate with the sensor sub-unit 111 in order to relay information to the surface 103. For example, communication between the telemetry apparatus below the motor 113 and the sensor sub-unit 111 may be accomplished by use of short hop acoustic or electromagnetic telemetry.

At the surface 103, supported by the drill string 101, a surface sub-unit 121 carries telemetry apparatus 122, which communicates with the telemetry apparatus 112 of the sensor sub-unit 111 through one or more wired or wireless communication channels, or through mud pulse or acoustic telemetry systems, such as the system described herein. The surface sub-unit 121 may also be supported by the surface rig 102. Signals received at the telemetry apparatus 122 may be processed within the telemetry apparatus 122 or sent to a surface installation 123 for processing.

As shown in FIG. 1, the surface installation 123 includes a transceiver 124 for communicating with the surface sub-unit 121, and a personal computer 125 coupled to the transceiver 124 for processing the signals from the sensor sub-unit 121 and reporting results to a drilling operator 126.

In certain instances when the mud motor 113 is driving the drill bit 104, the drill bit 104 may completely stop turning, referred to as a "complete" stall, which may block a fluid channel through the mud motor 113 and cause a pressure spike at the mud pump 129 at the surface. Such a pressure spike at the mud pump 129 is considered a reliable indicator of mud motor stalling. However, prior to such a complete stall of the mud motor 113, there often are several micro stalls that go undetected at the surface, in which the drill bit momentarily stops or slows down. A micro stall is a stall lasting a short time in comparison to the time for a complete stall to generate a maximum pressure spike, so that the micro stall has a pressure spike that has substantially less pressure than the maximum pressure spike. It is also possible that micro stalls may occur frequently without corrective action being taken during drilling because drilling is finished before a complete stall occurs.

Micro stalls produce impact loading on the stator elastomer in a similar way as a normally detected stall. A micro stall interrupts the flow of drilling mud into the mud motor 113, so that the drilling mud at the inlet of the mud motor impacts the stator elastomer with a momentary increase in pressure proportional to the density of the drilling mud and the rate of change of the velocity of the drilling mud at the inlet of the mud motor. Such repetitive impact loading reduces the lifetime of the elastomer due to repetitive stress and strain upon the elastomer, and also due to friction and abrasion as more drilling mud is forced between the regions of contact between the steel rotor and the elastomer of the stator.

Repetitive stress on the mud motor may also result from stick slip. Stick slip is known generally as a spontaneous jerking motion that can occur while two objects are sliding over each other. In the particular case of downhole drilling, stick slip usually results from the drill bit sticking to and then slipping from rock at the bottom or end of the borehole.

By knowing the frequencies of micro stalls and stick slips, mud motor operations can be optimized. By logging data about micro stalls and stick slips while drilling, suitable bits, motor types and muds can be configured for drilling nearby development wells based on the micro stall and stick slip data. Stalling and stick slips are different phenomena but both result in unintended loading of the stator elastomer.

Figure 2:
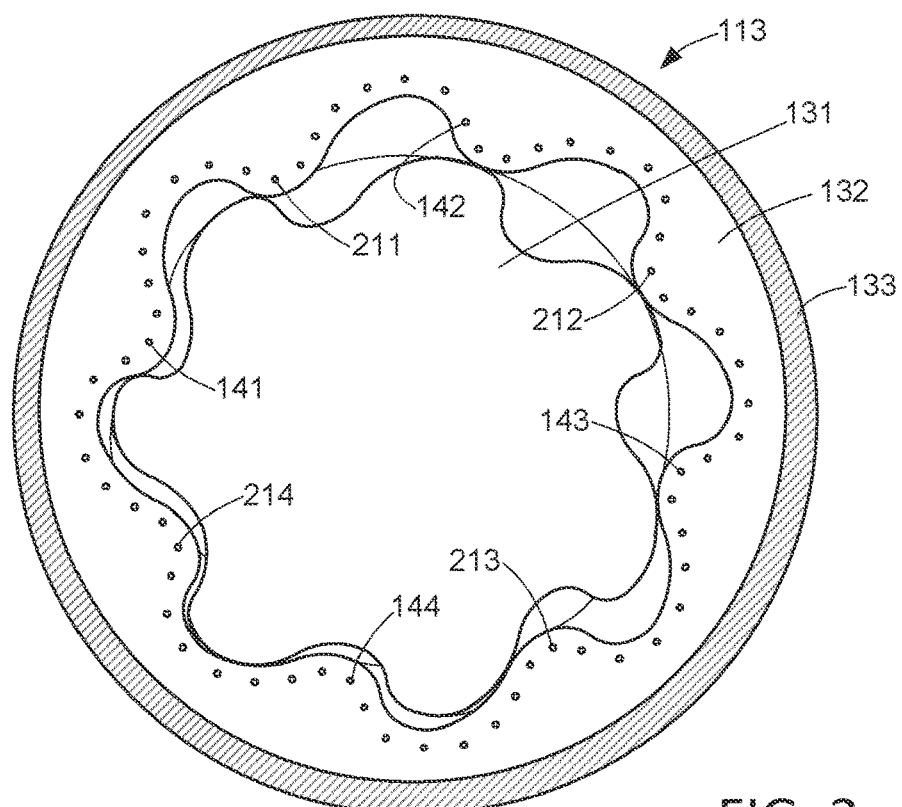
FIG. 2 is a diagram of a mud motor along section line 2-2 in FIG. 1.

FIG. 2 shows an example mud motor 113 that may be used to monitor micro stalls and stick slips during drilling operations, in accordance with aspects of the present disclosure. The mud motor 113 in FIG. 2 is an example of a positive displacement hydraulic motor known as a Moineau motor. In particular, the mud motor 113 has a steel rotor 131 and an elastomeric stator 132 within a tubular steel housing 133 of the mud motor 113. In this example, the external surface of the rotor 131 has seven helical lobes, and the internal surface of the stator 132 has eight helical lobes.

In general, the rotor of a Moineau motor is helical and may have as few as two lobes, and the stator of the Moineau motor is molded with a similar internal helical lobed pattern having one more lobe than the rotor, and the internal helical pattern has a longer pitch length than the rotor, in order to form sealed cavities between the rotor and the stator as the rotor turns and rolls within the stator. As the rotor turns and rolls within the stator, the axis of the rotor remains parallel to and displaced from the axis of the stator. Differential joints are interposed between the rotor and the drill bit to accommodate the rolling of the rotor within the stator.

To maintain the sealed cavities between the rotor and the stator, there should be contact between the elastomer of the stator and each lobe of the rotor. To reduce wear of the elastomer, however, the force at the areas of contact should be no more than is necessary to prevent a flow of drilling mud between the sealed cavities during drilling. Therefore the relative sizing of the rotor with respect to the cavity in the elastomer is chosen based on normal drilling conditions when the rotor turns at a certain speed under a rated load resulting in a certain pressure drop across the length of the rotor and stator in the mud motor. Once a mud motor is installed and lowered with a drill bit into a bore hole, it should be operated in accordance with its rated speed and load so that mud motor stalls are infrequent.

According to aspects of the present disclosure, one or more optical fibers 141, 142, 143, 144, etcetera are disposed in the elastomer of the stator 132. Deformations within the elastomer of the stator 132 may cause some or all of the optical fibers to elongate. Each optical fiber senses elongation via light conveyed by the fiber. For example, the optical fiber senses elongation by phase modulation due to a change in the length of the light propagation, or by Rayleigh or Brillouin scattering, or by Bragg diffraction.

For example, each optical fiber has one or more Bragg diffraction gratings inscribed or imprinted onto the fiber. Such a Bragg grating has a series of light scattering grooves inscribed or imprinted transversely across the fiber so that at least some of the light traveling within the fiber along the axis of the fiber in one direction is reflected to travel in the opposite direction. The light reflected by the Bragg grating is the superposition of the light scattered by the grooves, so that the reflected light has a maximum intensity when there is constructive interference of the light scattered by the grooves. For the typical case of a Bragg grating having grooves that are equally spaced from each other by a distance "d", known as the period of the Bragg grating, the condition of constructive interference occurs for $n\lambda=2d$, where "n" is an integer, and $\lambda$ is the wavelength of the light. Thus, the reflection coefficient of a Bragg grating in an optical fiber is function of the wavelength of the light and the period of the Bragg grating, so that the wavelength having a maximum reflection indicates the elongation within the optical fiber. Accordingly, micro stalls within the mud motor may be indirectly measured by measuring elongation within the optical fibers.

In one configuration, each optical fiber runs throughout the entire length of the stator 133 in a helical manner within a respective stator lobe. Therefore the elongation of the optical fiber, as measured by light reflection from the Bragg grating, is highly responsive to pressure of the drilling mud.

The elongation of certain segments of the optical fiber is also responsive to strain from contact between the lobes of the rotor 131 and the lobes of the stator 132. This strain from contact between the lobes is a periodic function of the angular position of the rotor with respect to the stator divided by the number (N) of stator lobes. For sensing mud pressure, the Bragg gratings can be disposed in each fiber so that the Bragg gratings measure a total elongation that is responsive to mud pressure but not the angular position of the rotor with respect to the stator. Also the elongation measured from multiple fibers can be summed or averaged to be responsive to pressure but not the angular position of the rotor with respect to the stator.

The summation or averaging of elongation measurements from multiple fibers also reduces uncorrelated noise in the elongation measurements. In this case the signal indicating mud pressure will add coherently, and the uncorrelated noise will add incoherently. Thus, the summation or averaging will increase the signal-to-noise ratio. For example, when two measurements are summed, the correlated signal will increase by 6 dB, and the uncorrelated noise will increase by 3 dB, so that the signal-to-noise ratio is increased by 3 dB.

In one configuration, when multiple fibers are used, the fibers are disposed symmetrically around the circumference of the stator so that the elongation measured from multiple fibers can be summed or averaged to cancel out variations due to the rotation and rolling of the rotor 131 within the stator 132. For example, when only four optical fibers are used, they are disposed at the positions 141, 142, 143, 144 shown in FIG. 2. As will be further described below with reference to FIGS. 14, 15, and 16, selected segments of each fiber can also be provided with respective Bragg gratings for sensing the angular position of the rotor 131 with respect to the stator 132 for correlating the micro stalls and stick slips with the angular position. The period of each Bragg grating is such that it reflects a particular wavelength of light under a stressed condition. Therefore it is possible to use different periods for different Bragg gratings in the same optical fiber to obtain independent measurements of the strain at each of the Bragg gratings.

As further shown in FIG. 2, still more optical fibers can be disposed in the stator 132 at more or less uniformly spaced locations around the entire stator. Each of these optical sensors may have multiple Bragg gratings, each of which has a different nominal period under an unstressed condition. Therefore the optical fibers may sense the condition of the elastomer at discrete circumferential and axial locations over the entire internal surface of the stator 132.

The optical fiber may be bonded to the elastomer of the stator 132 so that the positions of the Bragg gratings are fixed to the elastomer and strain in the elastomer causes a proportional elongation in the Bragg gratings. The optical fiber may be disposed at a precise depth within the elastomer and encased and bonded to the elastomer in such a way that the strain of the elastomer during drilling does not damage the optical fiber yet sufficient strain is conveyed from the elastomer to the optical fiber for detecting a strong signal of the strain in the elastomer.

Figure 3:
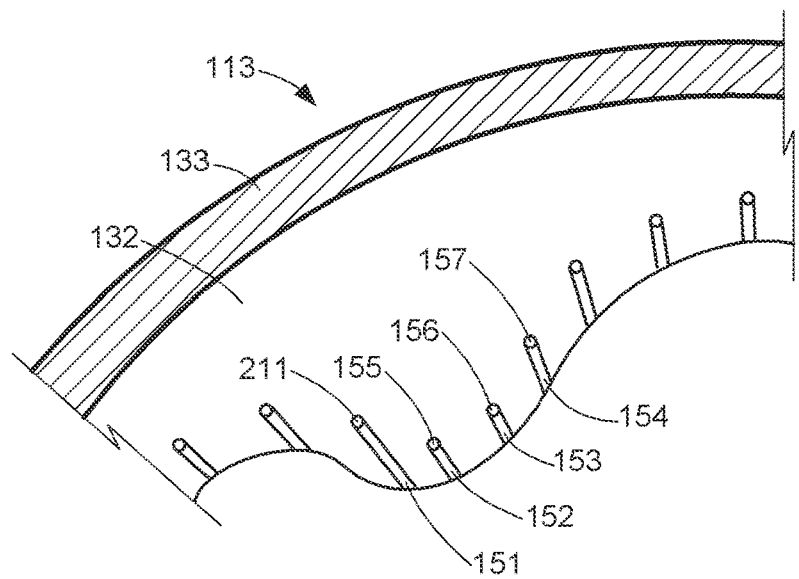
FIG. 3 is a diagram of grooves formed in the stator of the mud motor of FIG. 2 in order to dispose optical fiber in the grooves.

As further shown and described below with reference to FIGS. 14 and 17, the optical fiber at the top end of the stator 132 extends upward to a detector placed within the mud motor housing 133 in such a way that the optical fiber and detector are protected from the flowing drilling mud. i) There are various suitable ways of bonding the optical fiber to the elastomer. For example, as shown in FIG. 3, radial and helical grooves 151, 152, 153, 154, etcetera, are formed in the elastomer of the stator 132, and then respective optical fiber cables 211, 155, 156, 157, 158 coated with rubber adhesive are placed in the grooves, and then grooves are filled with the rubber adhesive. For example, the grooves 151, 152, 153, 154 are cut into the elastomer or are formed in the elastomer of the stator 132 when the elastomer is molded. For example, the grooves 151, 152, 153, 154 are formed when the elastomer is molded by radial and helical fins machined or molded on a sacrificial insert of a mold that molds that elastomer of the stator 132.

Figure 4:
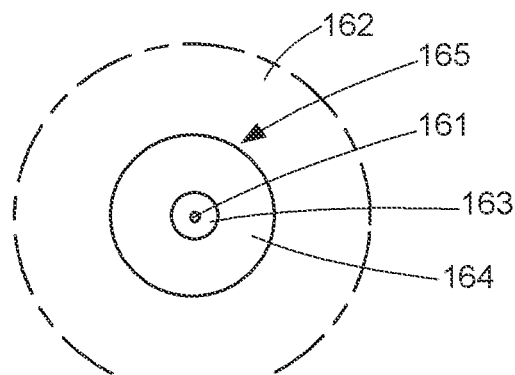
FIG. 4 shows another way of disposing an optical fiber in the stator of a mud motor.

FIG. 4 shows another way of bonding an optical fiber 161 to the elastomer 162 of a stator. In this example, the optical fiber 161 is disposed at the center of a semi-rigid carrier 163, and the semi-rigid carrier is covered with adhesive and inserted into a soft rubber tube 164 to form a semi-rigid fiber optic cable 165. For example, the semi-rigid carrier 163 is made of a composite plastic material. Then the fiber-optic cable 165 is wound on a helical mandrel having the desired pitch of the stator to form the helical shape that the fiber optic cable should have in the stator. Then the fiber-optic cable 165 is placed in the mold for the stator 162, so that the fiber-optic cable 165 becomes bonded to the elastomer 162 of the stator when the stator is molded.

Figure 5:
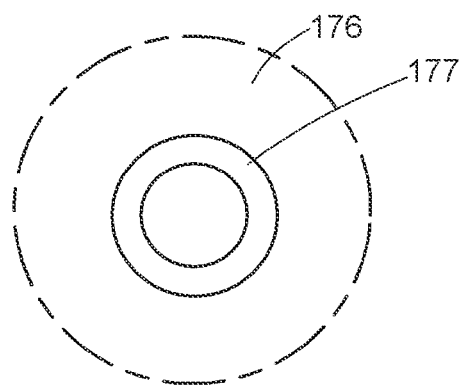
FIG. 5, FIG. 6, and FIG. 7 show yet another way of disposing an optical fiber in the stator of a mud motor.
Figure 6:
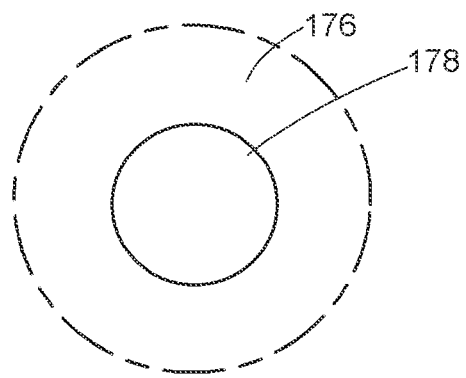
Figure 7:
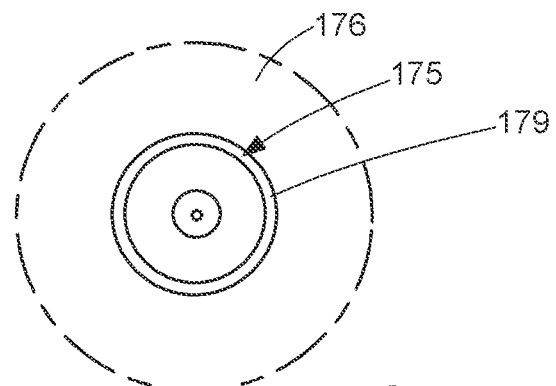

FIG. 5, FIG. 6, and FIG. 7 show yet another way of disposing an optical fiber cable 175 in a stator 176. The optical fiber cable 175 can be similar to the optical fiber cable 165 of the previous example, but the optical fiber cable 175 need not be rigid. In this example, the elastomer of the stator 176 is molded with a sacrificial helical tube 177 disposed where the optical fiber should appear. For example, an aluminum tube 177 is wound on a helical mandrel having the desired pitch of the stator 176, and then the aluminum tube 177 is placed in the mold for the stator, and then the stator is molded so that the aluminum tube becomes embedded in the elastomer of the stator. Then the aluminum tube is removed by flowing acid or alkali solution through the tube, resulting in a helical hole 178 through the length of the stator 176, as shown in FIG. 6. Then some rubber adhesive 179 is inserted into the hole, and then the fiber-optic cable 176 is inserted into the hole, so that the fiber-optic cable 176 becomes bonded to the elastomer 176 by a layer of the adhesive 179.

Figure 8:
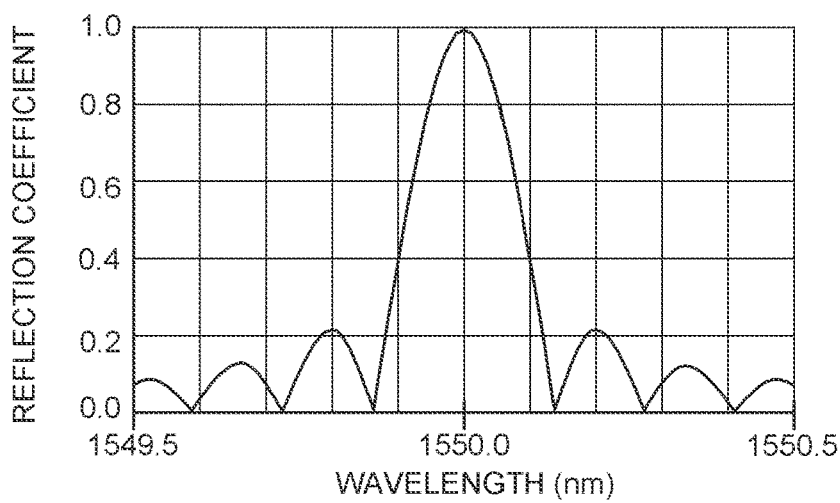
FIG. 8 shows a spectrum of light reflected by a Bragg grating in an optical fiber in the stator of the mud motor during normal drilling.

FIG. 8 shows a spectrum of light reflected by a Bragg grating in an optical fiber in the stator of the mud motor during normal drilling. The amplitude of the reflected light is a function of the period of the Bragg grating so that the amplitude has a peak value at a wavelength that is twice the period of the Bragg grating. Strain in the elastomer of the stator causes strain in the Bragg grating so that the period of the Bragg grating is proportional to the strain. Therefore the wavelength of the peak in the amplitude of the spectrum of the reflected light indicates the strain in the elastomer.

Figure 9:
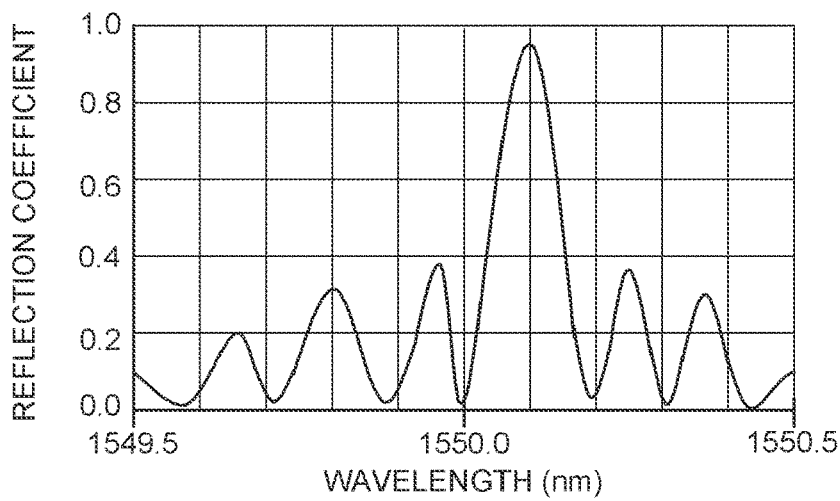
FIG. 9 shows the spectrum of light reflected by the Bragg grating when there is a stick slip of the rotor.

FIG. 9 shows a spectrum of light reflected by the Bragg grating when there is a stick slip of the rotor. The stick slip has caused the peak in the spectrum to increase from about 1,550.0 nanometers to about 1550.1 nanometers. This corresponds to a strain of about 0.0032 percent in the optical fiber.

Figure 10:
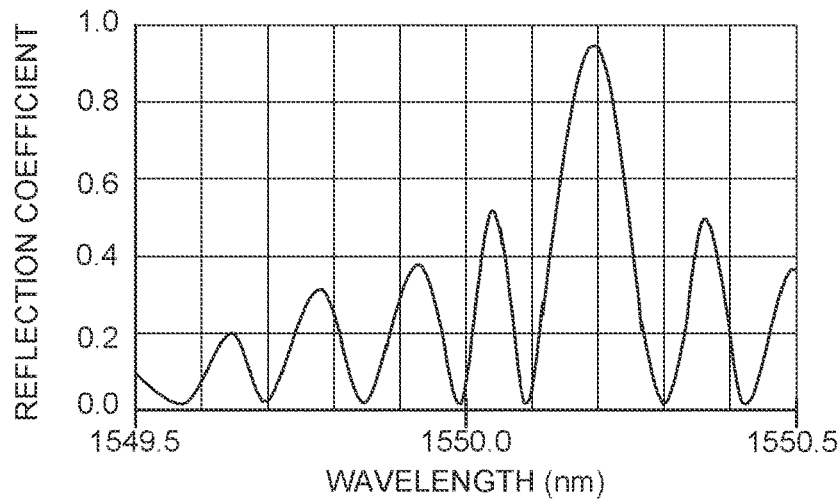
FIG. 10 shows a spectrum of light reflected by the Bragg grating when there is a micro stall of the rotor.

FIG. 10 shows a spectrum of light reflected by the Bragg grating when there is a micro stall of the rotor. When the mud-motor stalls, the torque on the rotor reaches its rated limit. This causes maximum strain in the elastomer of the rotor, causing maximum strain in the optical fiber. This causes a maximum change (increase) in the period of the Bragg grating. In this case the micro stall has caused the peak in the spectrum to increase to about 1550.2 nanometers. This corresponds to a strain of about 0.0064 percent in the optical fiber.

Figure 11:
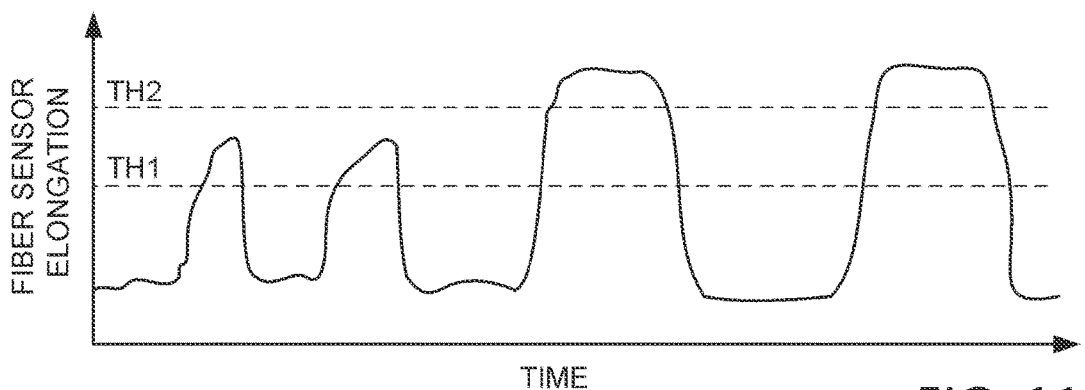
FIG. 11 shows a graph of elongation of a fiber sensor as a function of time during two stick slips followed by two micro stalls.

FIG. 11 shows a graph of elongation of an optical fiber sensor as a function of time during two stick slips followed by two micro stalls. During a stick slip, the elastomer is strained more than for the normal drilling conditions and will occasionally reach the maximum strain of the stall condition. However, the frequency of stick slips is greater than the frequency of stalls. In general, from the loading conditions it can be inferred that $\gamma_{drilling} < \gamma_{stick-slip} < \gamma_{stall}$, where "γ" is the wavelength of the peak of the spectrum of the reflected light.

Data from the optical fiber sensors can be processed in various ways while drilling or for analysis during logging in order to report anomalous conditions to the surface while drilling via up-hole acoustic or mud pulse telemetry. In one or more configurations, the collection of sensor data begins with the transmission of a pulse of light through one or more optical fibers, and the sensing of a reflection from the optical fiber via a spectrophotometer. The spectrophotometer produces, for each light pulse, an array of amplitude intensities ($A_i$) corresponding to respective light wavelengths ($\gamma_i$). Each Bragg grating has a corresponding nominal wavelength ($\gamma_o$) corresponding to a peak reflection for zero elongation. For each Bragg grating, the array of amplitude intensities is processed to compute a peak wavelength that is a mean value of amplitude intensities about the nominal wavelength of the Bragg grating. This peak wavelength is also averaged over a number of pulses to compute a data sample in the time domain for logging or for further analysis.

For example, the light pulses occur at a rate of about 100 microseconds, and the peak wavelength is averaged over one-thousand pulses to produce a data sample for logging at a rate of one log record every 100 milliseconds. This provides sufficient resolution in the time domain for the graph in FIG. 11. In this example, the presence of stick slip is indicated by a fiber sensor elongation falling between a first threshold (TH1) and a second threshold (TH2). The presence of a micro stall is indicated by a fiber sensor elongation exceeding the second threshold (TH2). The data is further processed in the frequency domain in order to reduce the data rate for up-hole telemetry or for presentation to a drilling operator.

Figure 12:
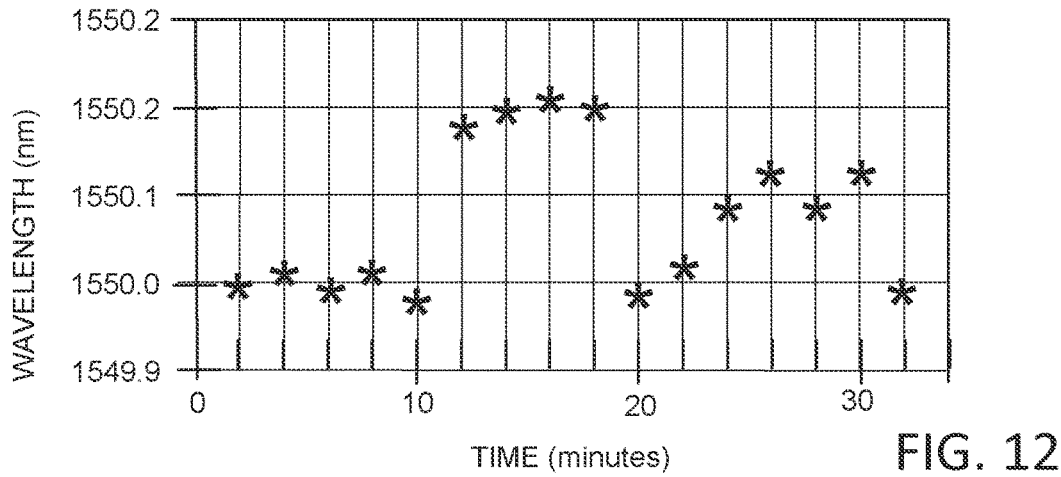
FIG. 12 shows a graph of the wavelength of light reflected by the Bragg grating as a function of time during normal drilling and during micro stalls and stick slips.

FIG. 12 shows a graph of the wavelength of light reflected by a Bragg grating in an optical fiber in the stator of a mud motor as a function of time during normal drilling and during stick slips and micro stalls. In this example, the data is averaged over a two-minute interval, so that one value of wavelength is plotted for each two-minute interval. In general, the interval is defined based on a desired level of accuracy, so that a longer interval provides more accuracy, at the expense of a delay in obtaining the result. In this particular example, normal drilling is identified at times of two, four, six, eight, ten, twenty, twenty-two, and thirty-two minutes. Micro stalls are identified at twelve, fourteen, sixteen, and eighteen minutes. Stick slips are identified at twenty-two, twenty-six, twenty-eight, and thirty minutes. However, this averaging over two-minute intervals may not clearly distinguish the case of frequent stick slips from the case of infrequent micro stalls, because each of these conditions may result in the same average wavelength of 1550.1 nanometers.

Figure 13:
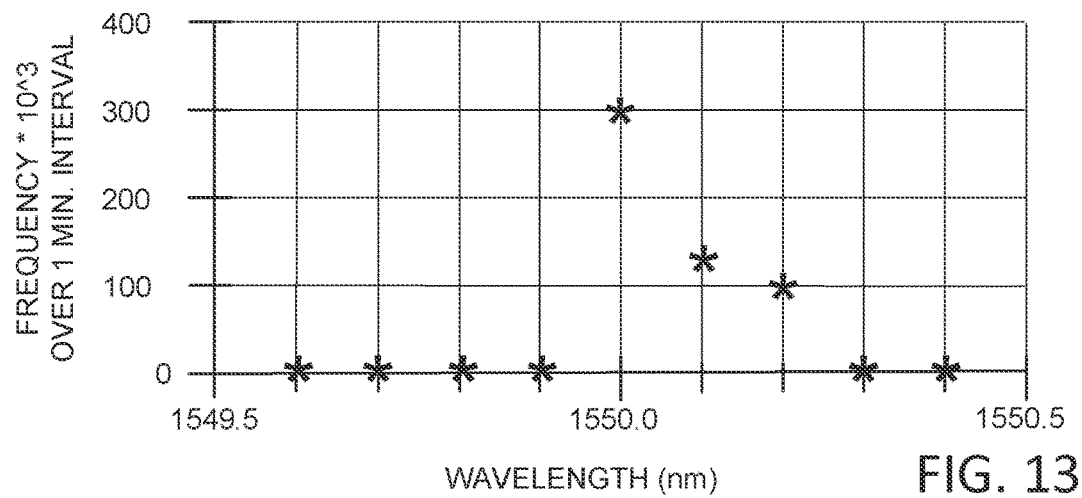
FIG. 13 shows a histogram of various wavelengths of light reflected by a Bragg grating in an optical fiber in the stator of a mud motor over a one minute interval of drilling.

FIG. 13 shows a histogram of various wavelengths of light reflected by a Bragg grating in an optical fiber in the stator of a mud motor over a one minute interval of drilling. In this example, the histogram records the frequency distribution of the peak wavelength computed from the reflection of each light pulse over the interval. Each peak wavelength is quantized to a particular resolution, which in this example is 0.1 nanometers. Thus, a peak wavelength quantized to 1550.0 nanometers is classified a normal drilling event, a peak wavelength quantized to 1550.1 nanometers is classified as a stick slip event, and a peak wavelength quantized to 1550.2 nanometers is a micro stall event. For example, as shown in FIG. 13, out of a total of about 6000 events during the one-minute interval, about 1500 of the events were stick slip events, and about 1000 of the events were micro stall events. This provides a convenient way of producing reduced data for up-hole telemetry during drilling. For example, a down-hole computer (251 in FIG. 18) in the mud motor sub-unit (113 in FIG. 1) or in another sub-unit (112, 114, 115 in FIG. 1) of the downhole tool assembly, and computes and reports the frequency of stick slips and the frequency of micro stalls every minute in two respective bytes of data.

Frequencies related to micro stalls and stick slips over a given interval can also be computed using a Fourier transform such as the Discrete Fourier Transform (DFT) upon time domain data of the kind shown in FIG. 11. For example, the desired resolution in frequency and the given interval determine a rate for the time domain data samples that serve as input to a Discrete Fourier Transform calculation. The rate for the time-domain data samples then determines the amount of averaging that is done upon the peak wavelength measurements prior to the Discrete Fourier Transform calculation. The averaging can be done by accumulating the peak wavelength measurements over the shorter interval of the time-domain data samples. For example, for a one-minute interval and a resolution of about 1 Hertz, the Discrete Fourier Transform calculation receives as input sixty-four time domain samples, so that the time domain signal as shown in FIG. 11 provides samples at a rate of 60/64=0.937 Hz to the Discrete Fourier Transform calculation.

Figure 14:
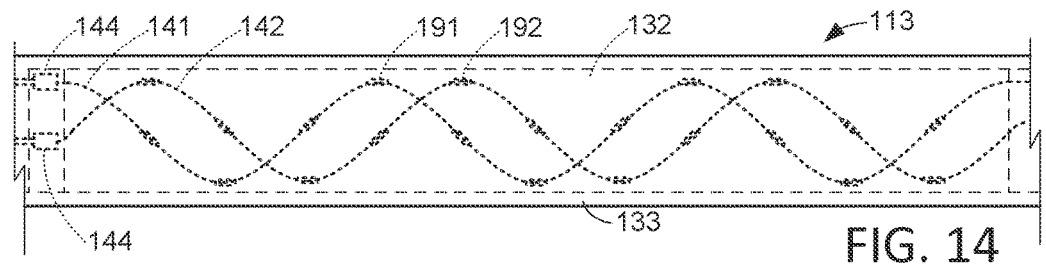
FIG. 14 is a side view of the stator of the mud motor showing the placement of multiple Bragg gratings in segments of each of two of the optical fibers.

FIG. 14 is a side view of the stator of the mud motor showing the placement of multiple Bragg gratings 191, 192, etcetera, in segments of each of two of the optical fibers 141, 143. In this example, the other optical fibers are omitted for clarity. The upper end of each optical fiber 141, 142 is terminated at a respective source and receiver assembly 144, 145. The source and receiver assemblies are bonded with rubber adhesive to the elastomer of the stator 132 and the mud motor housing 133 in order to protect the optical fibers from the flow of mud through the mud motor.

Figure 15:
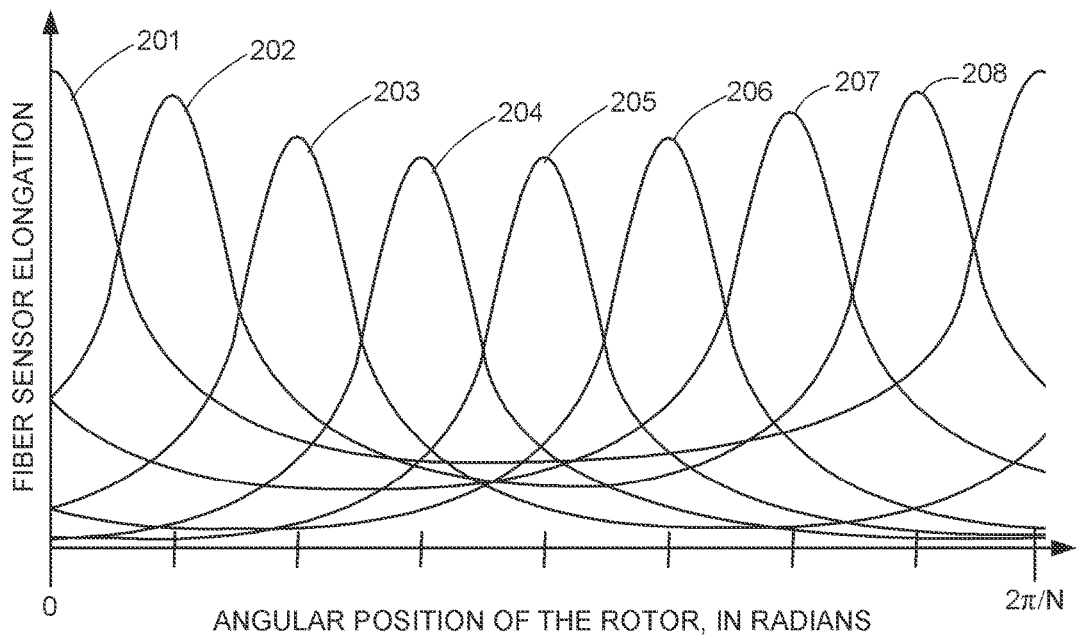
FIG. 15 is a graph of fiber sensor elongation as a function of angular position of the rotor for eight different Bragg gratings in fiber segments at eight different phase positions of the stator with respect to the rotor.

FIG. 15 is a graph of fiber sensor elongation as a function of angular position of the rotor for eight different Bragg gratings 201, 202, 203, 204, 205, 206, 207, 208 in fiber segments at eight different phase positions of the stator with respect to the rotor. For each Bragg grating, the fiber sensor elongation is a periodic function of the angular position of the rotor with respect to the stator in units of 2π radians divided by the number (N) of lobes on the rotor.

For example, an angular position of zero degrees corresponds to the rotor position shown in FIG. 2, and in this case maximum elongation occurs at the top end of the stator 132 for the optical fiber 142 in FIG. 2. Thus, a Bragg grating segment in the optical fiber 142 at the top end of the stator would produce the curve 201 in FIG. 15. In this same example, minimum elongation occurs at the top end of the stator 132 for the optical fiber 144 at the top end of the stator. Thus, a Bragg grating segment in the optical fiber 142 at the top end of the stator 132 would produce the curve 205 in FIG. 15. In a similar fashion, a Bragg grating segment in the optical fiber 143 at the top end of the stator 132 would produce the curve 203 in FIG. 15, and a Bragg grating segment in the optical fiber 141 at the top end of the stator 132 would produce the curve 207 in FIG. 15. The other curves could be produced by different Bragg gratings in these same optical fibers but located at another depth along the axis of the stator 132. Alternatively, the other curves 202, 204, 206, 208 could be produced by Bragg gratings in four more optical fibers (211, 212, 213, 214 in FIG. 2) disposed in the stator 132.

The angular position of the rotor can be tracked from the fiber sensor elongation measurements 201, 202, 203, 204, 205, 206, 207, and 208 by finding the two largest of the measurements, and then interpolating between these two largest measurements to determine the angular position to within the range of zero to 2π/N radians, and tracked between following sets of measurements to determine the angular position over the full range of zero to 2π radians.

Figure 16:
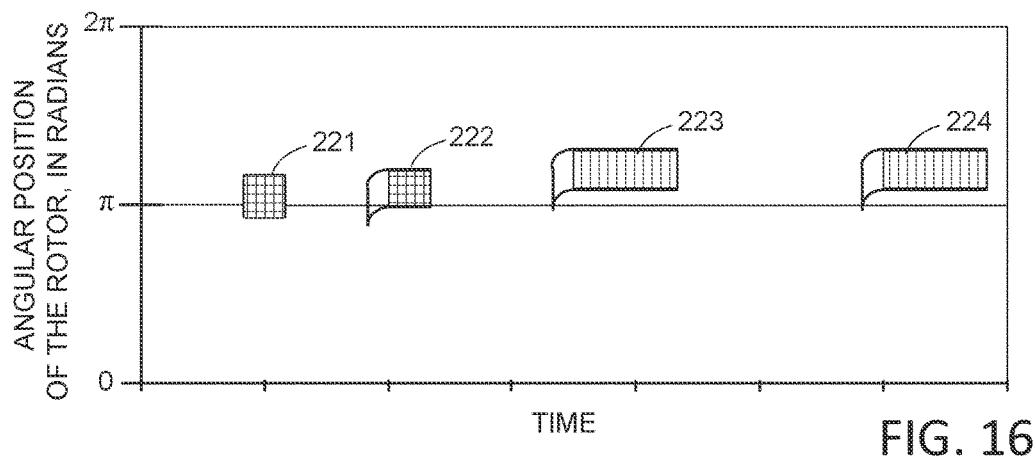
FIG. 16 is a graph for reporting correlation between stick slips or micro stalls and the angular position of the rotor with respect to the stator.

Then, as shown in FIG. 16, the stick slips and micro stalls can be correlated with the angular position of the rotor, and this correlation can be displayed graphically. In this example, stick slips and micro stalls according to the data of FIG. 11 are plotted as a function of time and angular position in FIG. 16, and the stick slips are distinguished from micro stalls by different cross hatchings representing different colors. For example, the represented color indicates the degree of fiber sensor elongation in the same way that a topographical map is color coded to show elevation. For example, the stick slips are indicated as regions 221, 222 shown with square cross-hatchings representing the color yellow, and the micro stalls are indicated as red regions 223, 224 shown with vertical line cross-hatchings representing the color red. This example of FIG. 16 shows a case where the stick slips and micro stalls are at about the same angular position of the rotor.

For up-hole data transmission, the correlation of stick slip and micro stall with angular position of the rotor could be done as a histogram recording the frequency of stick slips with respect to quantized values of angular position, and a histogram recording the frequency of micro stalls with respect to the quantized values of angular position.

Figure 17:
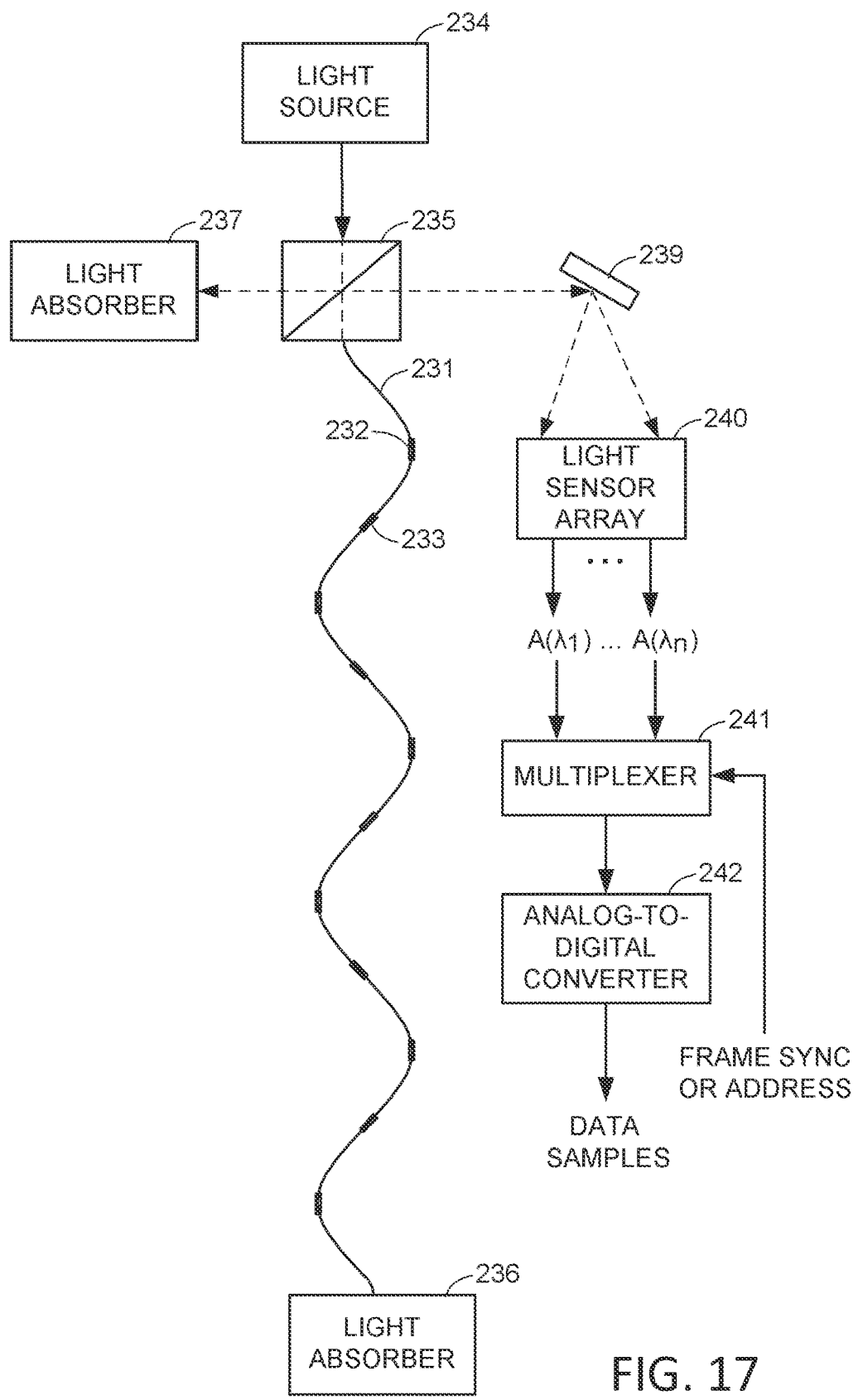
FIG. 17 shows a detector for an optical fiber including Bragg gratings.

FIG. 17 shows a detector for an optical fiber 231 including Bragg gratings 232, 233, etcetera. The detector includes a light source 234 such as a light-emitting diode (LED) or laser diode, a 3-dB coupler or beam splitter 235, a light absorber 236 at the bottom end of the optical fiber, a light absorber 237 terminating one side port of the 3-dB coupler or beam splitter 235, a diffraction grating 239, a light sensor array 240, a multiplexer 241, and an analog-to-digital converter 242. The diffraction grating 239 splits the light reflected by the Bragg gratings into a spectrum that is spread across the light sensor array 240.

The light sensor array 240, multiplexer 241, and analog-to-digital converter are included in a conventional linear optical sensor integrated circuit of the kind used in optical scanners. A frame sync pulse or address to the multiplexer 241 causes the integrated circuit to provide data samples indicating the amplitude of light received by the respective light sensors in the light sensor array 240.

Figure 18:
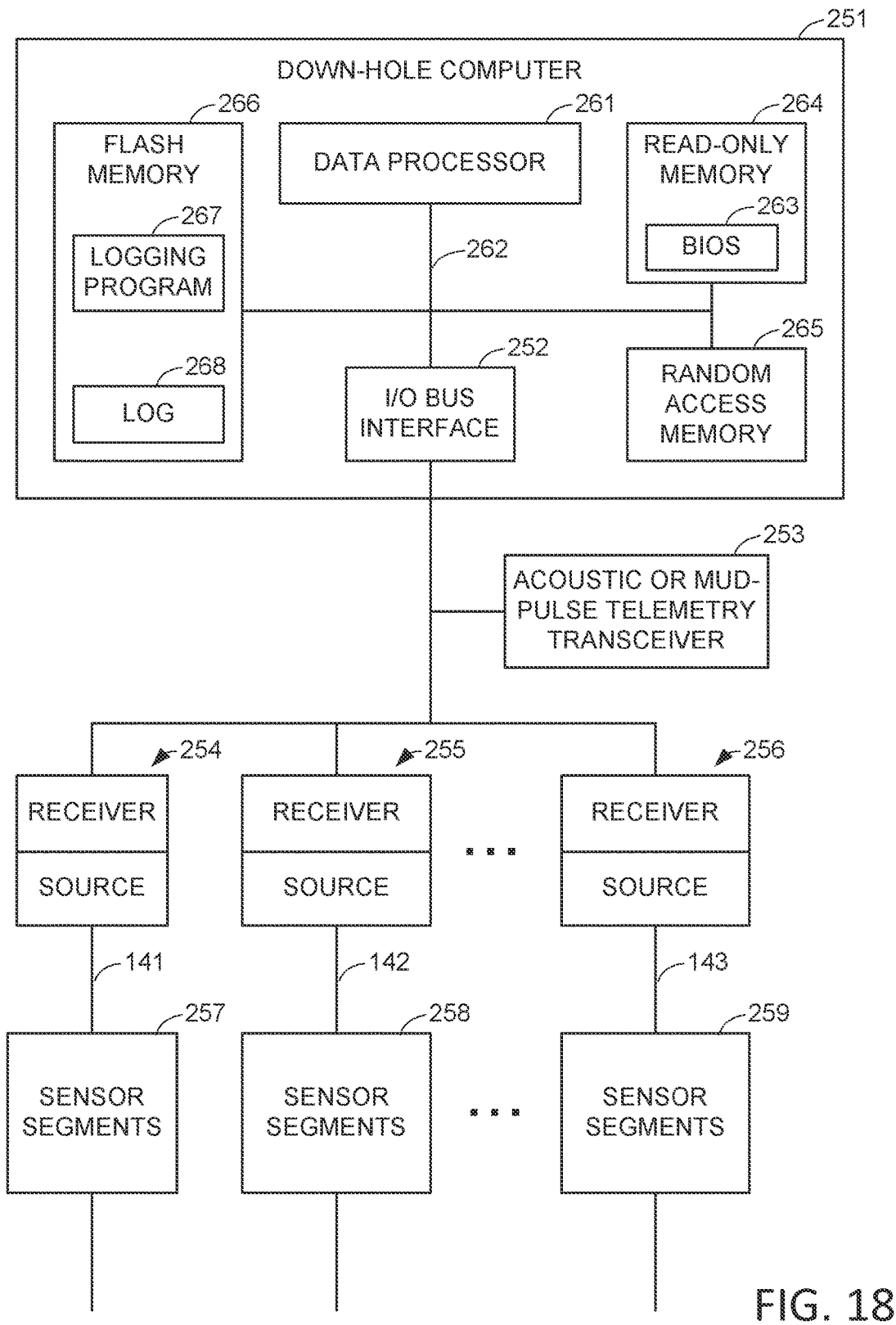
FIG. 18 is a block diagram of a down-hole computer and an interface for multiple optical sensor fibers in the mud motor.

FIG. 18 is a block diagram of a down-hole hardware computer 251 that can be used to compute periodically the frequency of stick slips and the frequency of micro stalls. Such a down-hole computer reduces the amount of data to be logged or transmitted to the surface while drilling. The down-hole hardware computer 251 has an interface 252 for an acoustic or mud-pulse telemetry transceiver 253 and optical sources and receivers 254, 255, 256 for the multiple optical fibers 141, 142, 143 and their associated sensor segments 257, 258, 259 in the mud motor. The down-hole computer 251 has a data processor 261, which may contain multiple core CPUs and cache memory shared among the core CPUs. The data processor 261 has a system bus 262. The system bus 262 can be any of several types of bus structures including a memory bus or memory controller, a peripheral bus, and a local bus using any of a variety of bus architectures. Basic input/output routines (BIOS) 263 stored in read-only memory 264 provide basic routines that help to transfer information between elements within the computer 251, such as during start-up. The computer 251 also has random access memory 265, and computer-readable storage media such as flash memory 266 coupled to the system bus 262. The flash memory 266 stores a well logging program 267 and a log 268. The well logging program 267 includes instructions that are executed by the data processor 261 to compute periodically the frequency of stick slips and the frequency of micro stalls.

During downhole drilling, the logging program periodically scans the receivers 254, 255, and 256 to collect data samples from the spectrophotometers in the receivers, and to determine respective peak wavelengths corresponding to elongation measured by the sensor segments 257, 258, 259 of the optical fibers. As discussed above, the peak wavelengths are averaged to measure mud pressure, and the peak wavelengths also can be used to track the angular position of the rotor with respect to the stator of the mud motor. Over a sampling interval including multiple samples of mud pressure, the multiple samples are processed in various ways to measure micro stalls and stick slip, as described above, for logging in the log 268 or for transmission to the surface and for reporting to a drilling operator.

When the down-hole drilling assembly is raised to the surface, all of the sensor data in the log 268 can be down-loaded to the computer (123 in FIG. 1) at the surface. The computer at the surface can then perform more precise measurement of the frequencies of the micro stalls and stick slips.

Figure 19:
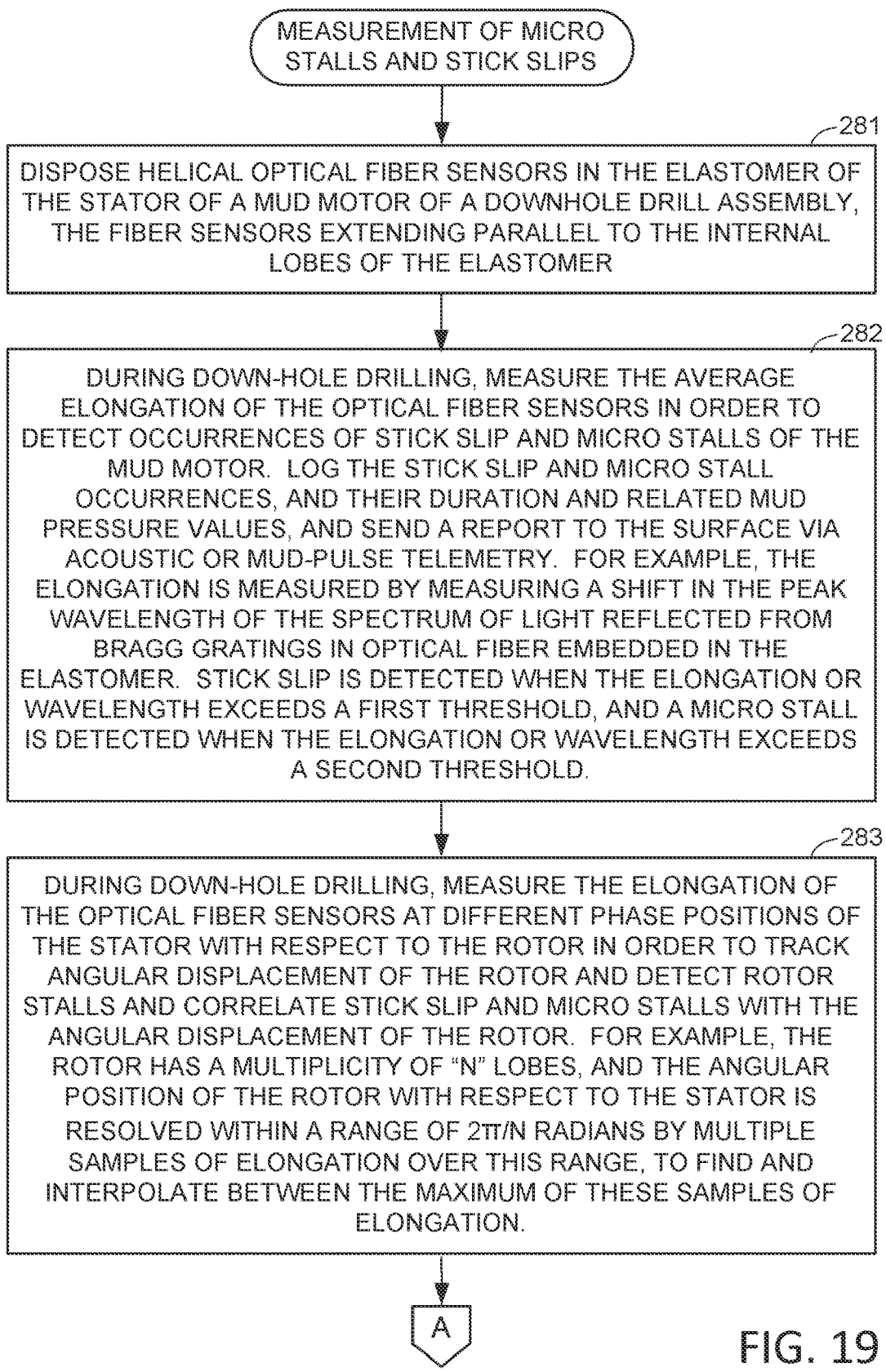
FIGS. 19 and 20 together comprise a flowchart of a process including measurement of micro stalls and stick slips using optical fiber sensors in a mud motor.
Figure 20:
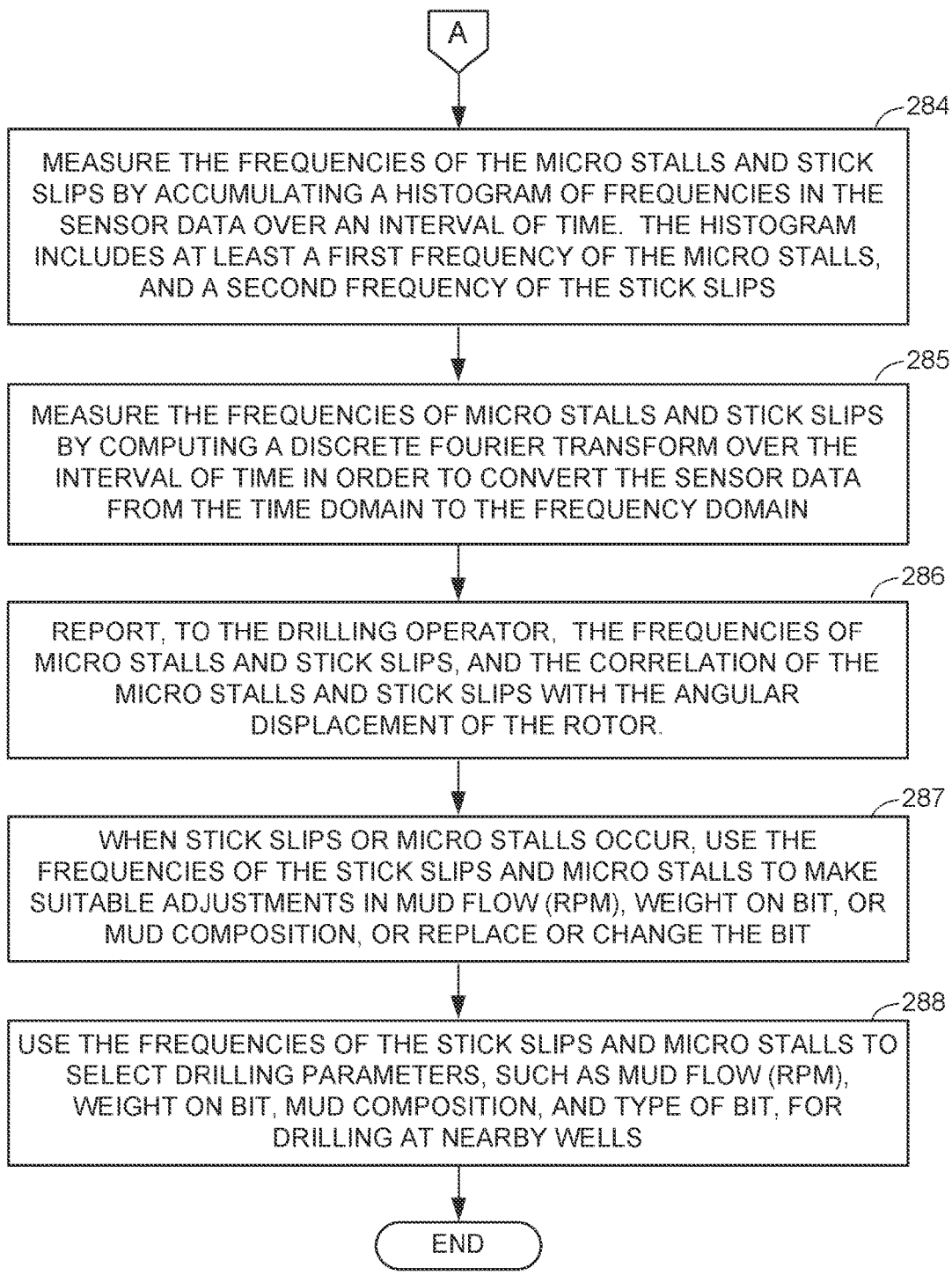

FIGS. 19 and 20 together comprise a flowchart of a process including measurement of micro stalls and stick slips using optical fiber sensors in a mud motor. In a first step 281, helical optical fiber sensors are disposed in the elastomer of the stator of a mud motor of a downhole drilling assembly so that optical fiber sensors extend parallel to the internal lobes of the elastomer.

Next, in step 282, during down-hole drilling, the elongation of the optical fiber sensors is measured in order to detect occurrences of stick slip and micro stalls of the mud motor. The stick slip and micro stall occurrences are logged and reported to the surface via acoustic or mud pulse telemetry.

For example, the elongation is measured by measuring a shift in the peak wavelength of the spectrum of light reflected from Bragg gratings in the optical fiber embedded in the elastomer. Stick slip is detected when the elongation or wavelength exceeds a first threshold, and micro stall is detected when the elongation or wavelength exceeds a second threshold.

In step 283, during down-hole drilling, the elongation of the optical fiber sensors is measured over segments of the fibers disposed at different phase positions of the stator with respect to the rotor in order to track angular displacement of the rotor and to detect rotor stalls and correlate stick slip and micro stalls with the angular position of the rotor. For example, the rotor has a multiplicity of "N" lobes, and the angular position of the rotor with respect to the stator is resolved with a range of $2\pi/N$ radians by multiple samples of elongation over this range, in order to find and interpolate between the maximum of these samples of elongation.

In step 284, the frequencies of micro stalls and stick slips are measured by accumulating a histogram of frequencies in the sensor data over an interval of time. The histogram includes at least a first frequency of the micro stalls, and a second frequency of the stick slips.

In step 285, the frequencies of micro stalls and stick slips are measured by computing a Discrete Fourier Transform over the interval of time in order to convert the sensor data from the time domain to the frequency domain.

In step 286, the frequencies of micro stalls and stick slips, and the correlation of the micro stalls and stick slips with the angular position of the rotor, are reported to the drilling operator.

In step 287, in response to the report of the frequencies of micro stalls and stick slips, the drilling operator makes suitable adjustments to the drilling parameters, such as mud flow (RPM), the weight on the bit (differential pressure), the mud composition, and the configuration of the bit. The adjustments can take into consideration time-domain data (for example as shown in FIG. 11) if that data is available, for example by downloading the time-domain data from the log (268 in FIG. 18).

In step 288, the report of the frequencies of micro stalls and stick slips is used to select the drilling parameters, such as the mud flow (RPM), the weight on the bit (differential pressure), the mud composition, and the configuration of the bit, for drilling a nearby well. The selection of the drilling parameters can also take into consideration time-domain data (for example as shown in FIG. 11) if that data is available, for example by downloading the time-domain data from the log (268 in FIG. 18).

The various embodiments described above are provided by way of illustration only and should not be construed to limit the scope of the disclosure. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims. Claim language reciting "at least one of" a set indicates that one member of the set or multiple members of the set satisfy the claim.

In view of the above, there has been described a method and apparatus for measuring micro stalls and stick slips in a mud motor during downhole drilling. A fiber optic sensor is disposed in the elastomer of the stator of the mud motor in order to sense elastomer strain while drilling. The frequencies of micro stalls and stick slips are measured from the fiber optic sensor data by classification using thresholds or by converting time-domain measurements from the fiber optic sensor data to frequencies. For example, the frequencies are produced by accumulating a histogram over an interval of time or by computing a Discrete Fourier Transform over an interval of time. The classification or conversion to the frequency domain can be done by a down-hole computer in the drilling assembly or by a computer at the surface using data down-loaded from a log of sensor data recorded in the down-hole drilling assembly. A plurality of fiber optic sensors can be disposed in the elastomer to sense the angular position of the rotor of the mud motor for correlation of the micro stalls and stick slips with the angular position. The measurements of the micro stalls and stick slips are used to select remedial action such as changes in drilling parameters for avoiding micro stalls and stick slips. This helps in optimizing the drilling and also helps in the selection of drilling parameters for nearby wells.

In a first example is disclosed a method of measuring stick slips and micro stalls in a down-hole mud motor, the method including positioning in a borehole a mud motor with an elastomeric stator and at least one fiber optic sensor within the elastomeric stator; receiving a measurement from the fiber optic sensor corresponding to a strain within the elastomeric stator; and processing the measurement to determine a frequency of at least one of a micro stall and a stick slip of the mud motor.

In a second example, there is disclosed herein the method according to the first example further including reporting the frequency of said at least one of a micro stall and a stick slip to a drilling operator.

In a third example, there is disclosed herein the method according to the first or second examples, wherein the digital computer is a down-hole digital computer, and the method further includes transmitting the frequency of said at least one of a micro stall and a stick slip up-hole from the down-hole computer to the drilling operator during the drilling, and the drilling operator using the frequency of said at least one of a micro stall and a stick slip to change drilling parameters for reducing the frequency of said at least one of a micro stall and a stick slip.

In a fourth example, there is disclosed herein the method according to the first or second examples, wherein the digital computer is a surface computer, and the method further includes logging the data from the fiber optic sensor in a down-hole memory during drilling, and after the drilling, down-loading the data from the down-hole memory to the surface computer, and the drilling operator using the frequency of said at least one of a micro stall and a stick slip for selecting drilling parameters for a nearby well.

In a fifth example, there is disclosed herein the method according to any of the preceding examples first to the fourth, which further includes the digital computer measuring frequencies of micro stalls and stick slips by classification using thresholds to distinguish micro stalls and stick slips from normal drilling and to distinguish micro stalls from stick slips.

In a sixth example, there is disclosed herein the method according to any of the preceding examples first to the fifth, which further includes the digital computer measuring frequencies of micro stalls and stick slips by accumulating a histogram of frequencies in the sensor data over an interval of time.

In a seventh example, there is disclosed herein the method according to any of the preceding examples first to the sixth, wherein the histogram includes at least a first frequency of the micro stalls, and at least a second frequency of the stick slips.

In an eighth example, there is disclosed herein the method according to any of the preceding examples first to the seventh, which further includes the digital computer measuring frequencies of the micro stalls and stick slips by computing a Fourier Transform over an interval of time in order to convert the data from the sensor from the time domain to the frequency domain.

In a ninth example, there is disclosed herein the method according to any of the preceding examples first to the eighth, wherein the fiber optic sensor includes a Bragg grating, and the method includes measuring a spectrum of light reflected from the Bragg grating with a spectrophotometer, and a down-hole computer processing data from the spectrophotometer to compute time-domain samples of peak wavelength in the spectrum of light reflected from the Bragg grating, and the down-hole computer computing frequencies of micro stalls and stick slips by converting the time-domain samples of peak wavelength to the frequency domain.

In a tenth example, there is disclosed herein the method according to any of the preceding examples first to the ninth, which further includes sensing strain of elastomer of the mud motor during drilling by sensing light from multiple fiber optic sensors disposed in the elastomer at different phase positions of the stator with respect to the rotor, processing data from the multiple fiber optic sensors with a down-hole digital computer to sense angular position of the rotor with respect to the stator, and correlating micro stalls and stick slips with the angular position of the rotor with respect to the stator.

In an eleventh example, disclosed herein is a system for measuring stick slips and micro stalls of a down-hole mud motor, the system comprising: a downhole mud motor having a rotor, an elastomer stator, and a fiber optic sensor disposed in the elastomer of the stator; and a computer communicably coupled to the fiber optic sensor, wherein the computer has a data processor and a computer-readable storage device storing instructions that, when executed by the data processor, cause the data processor to receive data generated at the fiber optic sensor; and determine frequencies of the micro stalls and stick slips based, at least in part, on the received data.

In a twelfth example, there is disclosed herein the system according to the eleventh example, wherein the instructions, when executed by the data processor, cause the data processor to report the frequencies of the micro stalls and stick slips to a drilling operator.

In a thirteenth example, the system according to the eleventh or twelfth example, wherein the instructions, when executed by the data processor, cause the data processor to measure the frequencies of the micro stalls and stick slips by classification using thresholds to distinguish micro stalls and stick slips from normal drilling and to distinguish micro stalls from stick slips.

In a fourteenth example, there is disclosed herein the system according to any one of the preceding examples eleventh to the thirteenth, wherein the instructions, when executed by the data processor, cause the data processor to measure the frequencies of the micro stalls and stick slips by accumulating a histogram of frequencies in the sensor data over an interval of time.

In a fifteenth example, there is disclosed herein the system according to any one of the preceding examples eleventh to the fourteenth, wherein the histogram includes at least a first frequency of the micro stalls, and at least a second frequency of the stick slips.

In a sixteenth example, there is disclosed herein the system according to any one of the preceding examples eleventh to the fifteenth, wherein the instructions, when executed by the data processor, cause the data processor to measure the frequencies of the micro stalls and stick slips by computing a Fourier Transform over an interval of time in order to convert the sensor data from the time domain to the frequency domain.

In a seventeenth example, there is disclosed herein the system according to any one of the preceding examples eleventh to the sixteenth, wherein the fiber optic sensor includes a Bragg grating, and the system further includes a spectrophotometer coupled to the fiber optic sensor, and wherein the instructions, when executed by the data processor, cause the data processor to measure the frequencies of the micro stalls and stick slips by processing data from the spectrophotometer to compute time-domain samples of peak wavelength in the spectrum of light reflected from the Bragg grating, and by computing frequencies of the micro stalls and stick slips by converting the time-domain samples of peak wavelength to the frequency domain.

In a eighteenth example, there is disclosed herein the system according to any one of the preceding examples eleventh to the seventeenth, where the fiber optic sensor comprises one of a plurality of fiber optic sensors disposed in the elastomer at different phase positions of the stator with respect to the rotor, and wherein the instructions, when executed by the data processor, cause the data processor to process data from the plurality fiber optic sensors to determine an angular position of the rotor with respect to the stator, and to correlate the micro stalls and stick slips with the angular position of the rotor with respect to the stator.

In a nineteenth example, there is disclosed herein a non-transitory computer-readable storage device storing instructions that, when executed by a data processor, cause the data processor to receive data from a fiber optic sensor disposed in the elastomer of the stator of a mud motor, process the received data to determine a frequency of at least one of a micro stall and stick slip of the mud motor; and report the determined frequency.

In a twentieth example, there is disclosed herein a computer-readable storage device as according to the nineteenth example, wherein the instructions, when executed by the data processor, cause at least one of the following: (1) the data processor to measure the frequencies of micro stalls and stick slips by classification using thresholds to distinguish micro stalls and stick slips from normal drilling and to distinguish micro stalls from stick slips; (2) the data processor to measure the frequencies of micro stalls and stick slips by accumulating a histogram of frequencies in the sensor data over an interval of time; and (3) the data processor to measure the frequencies of micro stalls and stick slips by computing a Fourier Transform over an interval of time in order to convert the sensor data from the time domain to the frequency domain.

What is claimed is:

1. A method of measuring stick slips and micro stalls in a down-hole mud motor, the method comprising:
    positioning in a borehole a mud motor with an elastomeric stator and at least one fiber optic sensor within the elastomeric stator, the fiber optic sensor including a Bragg grating;
    measuring a spectrum of light reflected from the Bragg grating with a spectrophotometer;
    processing, via a down-hole computer, data from the spectrophotometer to compute time-domain samples of peak wavelength in the spectrum of light reflected from the Bragg grating;
    receiving a measurement from the fiber optic sensor corresponding to a strain within the elastomeric stator; and
    processing, via the down-hole computer, the received measurement to determine frequencies of micro stalls and stick slips of the mud motor by converting the time-domain samples of peak wavelength to the frequency domain.

2. The method as claimed in claim 1, further comprising: reporting the frequency of said at least one of a micro stall and a stick slip to a drilling operator.

3. The method as claimed in claim 2, wherein the digital computer is a down-hole digital computer, and the method further includes transmitting the frequency of said at least one of a micro stall and a stick slip up-hole from the down-hole computer to the drilling operator during the drilling, and the drilling operator using the frequency of said at least one of a micro stall and a stick slip to change drilling parameters for reducing the frequency of said at least one of a micro stall and a stick slip.

4. The method as claimed in claim 2, wherein the digital computer is a surface computer, and the method further includes logging the data from the fiber optic sensor in a down-hole memory during drilling, and after the drilling, down-loading the data from the down-hole memory to the surface computer, and the drilling operator using the frequency of said at least one of a micro stall and a stick slip for selecting drilling parameters for a nearby well.

5. The method as claimed in claim 2, which includes the digital computer measuring frequencies of micro stalls and stick slips by classification using thresholds to distinguish micro stalls and stick slips from normal drilling and to distinguish micro stalls from stick slips.

6. The method as claimed in claim 2, which includes the digital computer measuring frequencies of micro stalls and stick slips by accumulating a histogram of frequencies in the sensor data over an interval of time.

7. The method as claimed in claim 6, wherein the histogram includes at least a first frequency of the micro stalls, and at least a second frequency of the stick slips.

8. The method as claimed in claim 2, which includes the digital computer measuring frequencies of the micro stalls and stick slips by computing a Fourier Transform over an interval of time in order to convert the data from the sensor from a time domain to a frequency domain.

9. The method as claimed in claim 2, which includes sensing strain of elastomer of the mud motor during drilling by sensing light from multiple fiber optic sensors disposed in the elastomer at different phase positions of the stator with respect to the rotor, processing data from the multiple fiber optic sensors with a down-hole digital computer to sense angular position of the rotor with respect to the stator, and correlating micro stalls and stick slips with the angular position of the rotor with respect to the stator.

10. A system for measuring stick slips and micro stalls of a down-hole mud motor, the system comprising:
    a downhole mud motor having a rotor, an elastomer stator, and a fiber optic sensor disposed in the elastomer of the stator, the fiber optic sensor including a Bragg grating;
    a spectrophotometer coupled to the fiber optic sensor; and
    a computer communicably coupled to the fiber optic sensor, wherein the computer has a data processor and a computer-readable storage device storing instructions that, when executed by the data processor, cause the data processor to
        process data from the spectrophotometer to compute time-domain samples of peak wavelength in a spectrum of light reflected from the Bragg grating, and
        process a measurement from the fiber optic sensor corresponding to a strain within the elastomer stator to determine frequencies of the micro stalls and stick slips of the mud motor by converting the time-domain samples of peak wavelength to the frequency domain.

11. The system as claimed in claim 10, wherein the instructions, when executed by the data processor, cause the data processor to report the frequencies of the micro stalls and stick slips to a drilling operator.

12. The system as claimed in claim 11, wherein the instructions, when executed by the data processor, cause the data processor to measure the frequencies of the micro stalls and stick slips by classification using thresholds to distinguish micro stalls and stick slips from normal drilling and to distinguish micro stalls from stick slips.

13. The system as claimed in claim 11, wherein the instructions, when executed by the data processor, cause the data processor to measure the frequencies of the micro stalls and stick slips by accumulating a histogram of frequencies in the sensor data over an interval of time.

14. The system as claimed in claim 13, wherein the histogram includes at least a first frequency of the micro stalls, and at least a second frequency of the stick slips.

15. The method as claimed in claim 11, wherein the instructions, when executed by the data processor, cause the data processor to measure the frequencies of the micro stalls and stick slips by computing a Fourier Transform over an interval of time in order to convert the sensor data from a time domain to a frequency domain.

16. The system as claimed in claim 11, where the fiber optic sensor comprises one of a plurality of fiber optic sensors disposed in the elastomer at different phase positions of the stator with respect to the rotor, and wherein the instructions, when executed by the data processor, cause the data processor to process data from the plurality fiber optic sensors to determine an angular position of the rotor with respect to the stator, and to correlate the micro stalls and stick slips with the angular position of the rotor with respect to the stator.

17. A non-transitory computer-readable storage device storing instructions that, when executed by a data processor, cause the data processor to
    receive data from a fiber optic sensor disposed in a mud motor having a rotor and an elastomer stator, wherein the fiber optic sensor is disposed in the elastomer stator of the mud motor and the fiber optic sensor includes a Bragg grating;

process the received data corresponding to a strain within the elastomer stator to determine frequencies of the micro stalls and stick slips of the mud motor by processing data from a spectrophotometer to compute time-domain samples of peak wavelength in a spectrum of light reflected from the Bragg grating, and by converting the time-domain samples of peak wavelength to the frequency domain; and report the determined frequencies of the micro stalls and stick slips.

18. The non-transitory computer-readable storage device as claimed in claim 17, wherein the instructions, when executed by the data processor, cause at least one of the following: (1) the data processor to measure the frequencies of micro stalls and stick slips by classification using thresholds to distinguish micro stalls and stick slips from normal drilling and to distinguish micro stalls from stick slips; (2) the data processor to measure frequencies of micro stalls and stick slips by accumulating a histogram of frequencies in the sensor data over an interval of time; and (3) the data processor to measure frequencies of micro stalls and stick slips by computing a Fourier Transform over an interval of time in order to convert the sensor data from a time domain to a frequency domain.

* * * * *